(12) United States Patent
Maeda et al.

(10) Patent No.: US 8,059,519 B2
(45) Date of Patent: Nov. 15, 2011

(54) INFORMATION RECORDING/REPRODUCING APPARATUS AND METHOD USING A PLURALITY OF PROBES

(75) Inventors: Takanori Maeda, Kawagoe (JP);
Tomotaka Yabe, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 76 days.

(21) Appl. No.: 12/528,559

(22) PCT Filed: Feb. 27, 2007

(86) PCT No.: PCT/JP2007/053636
§ 371 (c)(1),
(2), (4) Date: Sep. 30, 2009

(87) PCT Pub. No.: WO2008/105071
PCT Pub. Date: Sep. 4, 2008

(65) Prior Publication Data
US 2010/0014412 A1   Jan. 21, 2010

(51) Int. Cl.
*G11B 9/00* (2006.01)
(52) U.S. Cl. ..................... 369/126; 369/53.38
(58) Field of Classification Search ............... None
See application file for complete search history.

(56) References Cited

U.S. PATENT DOCUMENTS

| | | | |
|---|---|---|---|
| 5,394,388 A * | 2/1995 | Hatanaka et al. ............. | 369/126 |
| 5,835,477 A | 11/1998 | Binnig et al. | |
| 5,848,077 A | 12/1998 | Kamae et al. | |
| 2004/0204776 A1 | 10/2004 | Sri-Jayantha et al. | |
| 2005/0099895 A1 | 5/2005 | Maeda et al. | |
| 2005/0286396 A1 | 12/2005 | Raese et al. | |
| 2006/0023606 A1 | 2/2006 | Lutwyche et al. | |
| 2006/0182004 A1 * | 8/2006 | Maeda et al. .................. | 369/126 |
| 2008/0247300 A1 * | 10/2008 | Albrecht et al. .............. | 369/126 |

FOREIGN PATENT DOCUMENTS

| | | |
|---|---|---|
| EP | 1 662 499 A1 | 5/2006 |
| JP | 6-084209 | 3/1994 |
| JP | 06-195769 | 7/1994 |
| JP | 8-185699 | 7/1996 |
| JP | 2005-141831 | 6/2005 |
| WO | WO 00/36608 A2 | 6/2000 |

OTHER PUBLICATIONS

Extended European Search Report in EP 07 73 7438 mailed Dec. 3, 2010.
International Search Report for PCT/JP2007/053636, mailed Apr. 24, 2007.

* cited by examiner

*Primary Examiner* — Paul Huber
(74) *Attorney, Agent, or Firm* — Nixon & Vanderhye, P.C.

(57) ABSTRACT

An information recording/reproducing device is provided with a recording medium with a recording surface, a plurality of probes that carry out at least either record processing or reproduction processing by scanning a plurality of information tracks on the recording surface, a position detecting means that detects a position of at least one information track by using the probe for every plural divided regions into which the recording medium is divided in a direction intersecting the plural information tracks and which contain at least one information track, and a track control means that controls tracking of the probe used for at least either record processing or reproduction processing for every plural divided regions. Thus, the device structure can be simplified.

12 Claims, 6 Drawing Sheets

INFORMATION RECORDING/REPRODUCING APPARATUS AND METHOD USING A PLURALITY OF PROBES

This application is the U.S. national phase of International Application No. PCT/JP2007/053636 filed 27 Feb. 2007, which designated the U.S., the entire contents of which is hereby incorporated by reference.

TECHNICAL FIELD

The present invention relates to, for example, an information recording/reproducing apparatus for and method of recording information onto a recording medium which is formed of a ferroelectric substance or the like, or reproducing the recorded information, using a plurality of probes arranged in an array form.

BACKGROUND AND SUMMARY

As this type of invention recording/reproducing apparatus, there is an apparatus which brings a plurality of cantilever type probes into contact with a high-density, small recording medium, thereby reading and/or writing information. For example, the information is recorded or reproduced by using the plurality of probes arranged in a direction perpendicular to a scanning direction to scan a plurality of linear information tracks having a predetermined length, in parallel. In such construction, for example, if there is a temperature difference between the recording medium and the probe array in which the plurality of probes are disposed, a difference in their thermal expansion coefficients causes a deviation between the information tracks and each probe, which makes it hardly possible to read and/or write the information. Thus, there has been suggested a technology in which each of the plurality of probes disposed in the probe array is driven independently (refer to a patent document 1).

Patent document 1: Japanese Patent Application Laid Open No. Hei 6-195769

DISCLOSURE OF INVENTION

Subject to be Solved by the Invention

According to the aforementioned technology, however, a structure for supporting each probe becomes complicated, and moreover, an electrical circuit is provided to drive each probe. This basically makes it hard to simplify and miniaturize the apparatus, which is technically problematic. In particular, in order to perform super high-density recording, it is extremely preferable to form the plurality of probes in a small area (or domain), so that the simplification or miniaturization of the apparatus here is extremely important.

In view of the aforementioned problems, it is therefore an object of the present invention to provide an information recording/reproducing apparatus and method which are stable for the simplification of the apparatus structure.

The above object of the present invention can be achieved by an information recording/reproducing apparatus provided with: a recording medium having a recording surface; a plurality of probes for performing at least one process of information recording and reproduction by scanning a plurality of information tracks in parallel, on the recording surface; a position detecting device for detecting a position of at least one information track by using the probes, in each of a plurality of divided areas obtained by area-dividing the recording surface in a direction crossing the plurality of information tracks and in such a manner that each divided area includes at least one information track; and a tracking control device for performing tracking control on the probes in performing the at least one process, in each of the plurality of divided areas set, on the basis of the detected position of the track.

According to the information recording/reproducing apparatus of the present invention, at least one process of information recording and reproduction is performed by the plurality of probes scanning the plurality of information tracks in parallel on the recording surface of the recording medium. In other words, the information recording/reproducing apparatus of the present invention may be any of an apparatus only for information recording, an apparatus only for information reproduction, and an apparatus for both information recording and reproduction. Incidentally, the probes and the information tracks are disposed at predetermined intervals, respectively. In order to correctly record or reproduce the information, the probe interval and the information track interval may have values close to each other.

In particular, in the present invention, the recording surface of the recording medium is area-divided (hereinafter simply referred to as "divided", as occasion demands) in the direction crossing the information tracks, and they are treated as the plurality of divided areas each of which includes at least one information track. Incidentally, "area-dividing the recording surface in a direction crossing the plurality of information tracks" means dividing it by a dividing line extending in a direction along the information tracks. At this time, there may be set one or a plurality of dividing lines. Moreover, the "area-dividing" herein does not mean the physical division of the recording medium but is division in terms of control, to regard the recording surface as the plurality of divided areas and to process it. The number of the information tracks included in each divided area may be the same or different.

Then, with respect to the plurality of divided areas, the position of at least one information track in each area is detected by using the probes. When the position of the information track is detected, the probes are tracking-controlled on the basis of the position, and thus, the information recording and reproduction are performed.

If the position detection of the information track in each divided area as described above is not performed, for example, in a case where the recording medium and a probe array have different thermal expansion coefficients or in similar cases, a deviation occurs between the probe interval and the information track interval due to thermal expansion. Thus, the probes cannot scan the information tracks, thereby likely not performing the correct information recording or reproduction.

In the present invention, however, in particular, the position of at least one information track is detected in each divided area, and the probes are tracking-controlled on the basis of the detected position. Thus, it is possible to include the deviation between the probes and the information tracks, in an allowable range which allows the correct information recording and reproduction (or without an error) to be performed on the plurality of information tracks existing in the same divided area. Alternatively, in the case of the relatively small deviation as described above, it can be corrected, relatively easily. As described above, it is possible to correctly perform the recording and reproduction on the information tracks, by using the probes, simultaneously or in parallel by a unit of divided area.

Moreover, the aforementioned operation can be realized without significantly changing the structure of the apparatus or adding new parts or the like. Thus, it is possible to simple or miniaturize the apparatus.

As explained above, according to the information recording/reproducing apparatus of the present invention, it is possible to record or reproduce the information, correctly, in the simple structure of the apparatus.

In one aspect of the information recording/reproducing apparatus of the present invention, it is further provided with a setting device for setting the plurality of divided areas, the position detecting device detecting the position of the information track in each of the plurality of divided areas set.

According to this, the plurality of divided areas are set by the setting device, and the position of the information track is detected in each of the plurality of areas set. Thus, the setting of the divided area can be changed as occasion demands, depending on circumstances, such as, for example, reducing the size of the divided area if it is predicted or estimated that the deviation is relatively large, and on the other hand, increasing the size of the divided area if it is predicted or estimated that the deviation is relatively small. Incidentally, even if the divided areas are set as fixed areas in advance, the aforementioned effects by the present invention are properly obtained.

As a result, according to the information recording/reproducing apparatus of the present invention, even if an environment surrounding the apparatus and the status of the apparatus itself are changed in various manners, it is possible to record or reproduce the information, correctly, in the simple structure of the apparatus.

In another aspect of the information recording/reproducing apparatus of the present invention, the setting device sets the plurality of divided areas to be variable in accordance with a value or status of a predetermined type of signal obtained by the scanning of the probes.

According to this aspect, the plurality of divided areas are set to be variable, in accordance with the value or status of the predetermined type of signal obtained by the scanning of the probes. The "predetermined type of signal" is, for example, a reproduction signal, a tracking signal, and a signal or the like which indicates an error occurrence rate, jitter, and the like. By recording test data or the like, the value or status of the signal can be obtained before the information recording. Moreover, "set . . . to be variable" not only means arbitrary setting the number, size, or the like of the divided areas (i.e. the number of information tracks included) in the setting, but also includes a case of changing what is set in advance, i.e. what is set in accordance with an individual apparatus specification and a required signal accuracy or the like before or after shipping or in checking. The same meaning shall apply in other aspects shown hereinafter.

For example, by detecting a signal amplitude and an error rate, it is judged whether the information is correctly recorded or reproduced. Then, with respect to the divided area including the information track in which it is judged that the formation is not correctly recorded or reproduced, it is set to reduce the number of the information tracks included. As a result, the tracking control of the probes is performed at higher accuracy.

As explained above, according to the information recording/reproducing apparatus in this aspect, even if the quality related to the recording and reproduction varies, it is possible to record or reproduce the information, correctly, in the simple structure of the apparatus.

In another aspect of the information recording/reproducing apparatus of the present invention, it is further provided with a detecting device for detecting at least one of a temperature related to the recording medium and a temperature related to the probes, the setting device setting the plurality of divided areas to be variable in accordance with the detected temperature.

According to this aspect, at least one of the temperature related to the recording medium and the temperature related to the probes is detected, and the plurality of divided areas are set to be variable in accordance with the detected temperature. Incidentally, the temperature may be directly detected for the recording medium and the probes, or the temperature of their support parts or surrounding temperature may be detected. Moreover, the "detection" may be measurement, or it may be calculation.

In particular, in this aspect, the amount of the deviation between the probes and the information tracks caused by the thermal expansion, or the like, is predicted from the temperature related to the recording medium and the temperature related to the probes, and the number of the information tracks included in each divided area is changed. In particular, if both the temperature related to the recording medium and the temperature related to the probes are detected, it is also possible to respond to a case where there is a temperature difference between the recording medium and the probes due to a difference in heat release between the recording medium and the probes.

As explained above, according to the information recording/reproducing apparatus in this aspect, even if there is a significant difference in thermal expansion between the recording medium and the probe array, it is possible to record or reproduce the information, correctly, in the simple structure of the apparatus.

In another aspect of the information recording/reproducing apparatus of the present invention, the setting device sets the plurality of divided areas to be variable in accordance with an amount of the information.

According to this aspect, the plurality of divided areas are set to be variable in accordance with the amount of the information. In other words, the number of the information tracks included in each divided area is set in accordance with the amount of the information to be recorded or reproduced.

For example, the amount of the information to be recorded or reproduced influences the probe scanning number. Thus, by setting the divided areas in accordance with the probe scanning number, it is possible to make a division into the divided areas to the extent that the deviation does not cause any problem to the recording and reproduction, and it is possible to avoid unnecessarily fine division.

As explained above, according to the information recording/reproducing apparatus in this aspect, whether the amount of the information is large or not, it is possible to record or reproduce the information, correctly, in the simple structure of the apparatus.

In another aspect of the information recording/reproducing apparatus of the present invention, the setting device calculates the number of the information tracks for recording the information on the basis of an amount of the information, and the setting device sets the plurality of divided areas to be variable in accordance with the calculated number of the information tracks.

According to this aspect, firstly, the number of the information tracks for recording the information is calculated on the basis of the amount of the information to be recorded or reproduced. Then, the plurality of divided areas are set to be variable in accordance with the number of the information tracks.

For example, it is possible to calculate the probe scanning number from the number of the information tracks for recording the information to be recorded or reproduced. Thus, by setting the number of the divided areas on the basis of the probe scanning number, it is possible to make a division into the divided areas to the extent that the deviation does not cause any problem to the recording and reproduction, and it is possible to avoid the unnecessarily fine division.

As explained above, according to the information recording/reproducing apparatus in this aspect, whether the amount of the information is large or not, it is possible to record or reproduce the information, correctly, in the simple structure of the apparatus.

In another aspect of the information recording/reproducing apparatus of the present invention, the position detecting device detects the position of one information track existing on one edge side of the divided area, of the plurality of information tracks, as the position, in each of the plurality of divided areas.

According to this aspect, the position of one information track existing on one edge side of the divided area of the plurality of information tracks is detected in each of the plurality of divided areas.

If the deviation of the probes with respect to the information tracks is, for example, a deviation caused by the thermal expansion, the deviation with respect to the information tracks existing closer to the edge sides which are away from each other is considered to be larger. Thus, by performing the tracking control on the basis of the position of the information track existing on the edge side in which the deviation is large, it is possible to make a division into the divided areas to the extent that the deviation does not cause any problem to the recording and reproduction, and it is possible to avoid the unnecessarily fine division.

As explained above, according to the information recording/reproducing apparatus in this aspect, even if there is a significant difference in thermal expansion between the recording medium and the probe array, it is possible to record or reproduce the information, correctly, in the simple structure of the apparatus.

In another aspect of the information recording/reproducing apparatus of the present invention, the position detecting device detects the position of one information track existing on a central side of the divided area, of the plurality of information tracks, as the position, in each of the plurality of divided areas.

According to this aspect, the position of one information track existing on the central side of the divided area of the plurality of information tracks is detected in each of the plurality of divided areas. Incidentally the "central side" means a position at which there is at least one information track on the edge side.

By detecting the position of the information track on the central side in the divided area and by performing the tracking control on the basis of the detected position, it is possible to make a division into the divided areas to the extent that the deviation does not cause any problem to the recording and reproduction, and it is possible to avoid the unnecessarily fine division. In particular, if the position of the information track closer to the center of the divided area is detected, it is advantageous in a case where the deviation in each divided area extends or expands symmetrically to the center, such as expanding in a bilaterally symmetric manner.

As explained above, according to the information recording/reproducing apparatus in this aspect, it is possible to record or reproduce the information, correctly.

In an aspect in which the position of one information track on the edge side of the divided area is detected, as described above, it may be further provided with a monitoring device for monitoring quality of a predetermined type of signal obtained by the probes scanning one or a plurality of information tracks existing on the other edge side located on an opposite side to the one edge, in the divided area, the setting device resetting the plurality of divided areas so that the process is performed again in the information in which the process has been performed on the one or the plurality of information tracks existing on the other edge side, if the monitored quality does not reach a predetermined threshold value, the information recording/reproducing apparatus further provided with a processing control device for controlling the probes to perform the process again on the one or the plurality of information tracks existing on the other edge side, if the plurality of divided areas are reset.

By virtue of such construction, the quality of the predetermined type of signal obtained by the probes scanning the one or the plurality of information tracks existing on the other edge side located on the opposite side to the one edge in the divided area is monitored, and it is judged whether or not the signal quality reaches the predetermined threshold value. Then, if the signal quality does not reach the predetermined threshold value, the recording or reproducing process is performed on the one or the plurality of information tracks existing on the other edge side before the plurality of divided areas are reset. In other words, the number, size, or the like of the divided areas is changed. If the divided areas are reset, the probes are controlled to perform the process again on the one or the plurality of information tracks existing on the other edge side.

When the tracking control is performed on the basis of the position of the information track existing on the one edge, the deviation likely increases in the information tracks existing on the other edge side which is opposite to the one edge.

However, in this construction, in particular, if the quality of the signal obtained from the one or the plurality of information tracks existing on the other edge side opposite to the one edge side on which the tracking control is performed does not reach the predetermined threshold value (i.e. if the information recording or reproduction is not correctly performed), the divided areas are reset, and the recording or reproducing process is performed again. Thus, even if the information recording or reproduction is not performed correctly on the information tracks on the other edge side in one scanning, re-recording or re-reproduction is performed on the information tracks on which the information recording or reproduction has not been correctly performed (hereinafter referred to as an error tracks, as occasion demands), by resetting the divided areas. In other words, by performing the process again, it is possible to perform the information recording or reproduction, correctly, on the error tracks.

As explained above, according to the information recording/reproducing apparatus in this construction, even if such information tracks appear that the information recording or reproduction cannot be correctly performed, it is possible to record or reproduce the information, correctly, by resetting the divided areas and by performing the recording or reproducing process again.

In an aspect in which the position of the information track existing on the central side of the divided area is detected, as described above, it may be further provided with a monitoring device for monitoring quality of a predetermined type of signal obtained by the probes scanning one or a plurality of information tracks existing on the other edge side located on an opposite side to the one edge, in the divided area, the setting device resetting the plurality of divided areas so that the process is performed again in the information in which the process has been performed on the one or the plurality of information tracks existing on the other edge side, if the monitored quality does not reach a predetermined threshold value, the information recording/reproducing apparatus further provided with a processing control device for controlling the probes to perform the process again on the one or the plurality of information tracks existing on the other edge side, if the plurality of divided areas are reset.

By virtue of such construction, the quality of the predetermined type of signal obtained by the probes scanning the one or the plurality of information tracks existing on the other edge side located on the opposite side to the one edge in the divided area is monitored, and it is judged whether or not the signal quality reaches the predetermined threshold value. Then, if the signal quality does not reach the predetermined threshold value, the recording or reproducing process is performed on the one or the plurality of information tracks existing on the other edge side before the plurality of divided areas are reset. In other words, the number, size, or the like of the divided areas is changed. If the divided areas are reset, the probes are controlled to perform the process again on the one or the plurality of information tracks existing on the other edge side.

When the tracking control is performed on the basis of the position of the information track existing on the central side, the deviation likely increases in the information tracks existing on the other edge side which is opposite to the one edge.

However, in this construction, in particular, if the quality of the signal obtained from the one of the plurality of information tracks existing on the other edge side opposite to the one edge side on which the tracking control is performed does not reach the predetermined threshold value (i.e. if the information recording or reproduction is not correctly performed), the divided areas are reset, and the recording or reproducing process is performed again. Thus, even if the information recording or reproduction is not performed correctly on the information tracks on the other edge side in one scanning, re-recording or re-reproduction is performed by resetting the divided areas. In other words, by performing the process again, it is possible to perform the information recording or reproduction, correctly, on the error tracks.

As explained above, according to the information recording/reproducing apparatus in this construction, even if such information tracks appear that the information recording or reproduction cannot be correctly performed, it is possible to record or reproduce the information, correctly, by resetting the divided areas and by performing the recording or reproducing process again.

In another aspect of the information recording/reproducing apparatus of the present invention, it is further provided with a monitoring device for monitoring quality of a predetermined type of signal obtained by the probes scanning, the setting device resetting the plurality of divided areas so that the process is performed again, if the monitored quality does not reach a predetermined threshold value, the information recording/reproducing apparatus further provided with a processing control device for controlling the probes to perform the process again, if the plurality of divided areas are reset.

According to this aspect, the quality of the predetermined type of signal obtained by the probes scanning is monitored, and it is judged whether or not the signal quality reaches the predetermined threshold value. Then, if the signal quality does not reach the predetermined threshold value, the divided areas are reset, and the probes are controlled to perform the information recording or reproducing process.

In this aspect, in particular, if the monitored signal quality does not reach the predetermined threshold value (i.e. if the information recording or reproduction is not correctly performed), the divided areas are reset, and the recording or reproducing process is performed again. Thus, even if the information recording or reproduction is not performed correctly in the first process, re-recording or re-reproduction is performed by resetting the divided areas. In other words, by performing the process again, it is possible to record or reproduce the information, correctly, with respect to the error tracks.

As explained above, according to the information recording/reproducing apparatus in this construction, even with respect to the information tracks on which the information recording or reproduction is likely not correctly performed, it is possible to record or reproduce the information, correctly by resetting the divided areas and by performing the recording or reproducing process again.

In another aspect of the information recording/reproducing apparatus of the present invention, the position detecting device detects a servo mark recorded in association with the information track on the recording surface.

According to this aspect, the servo mark recorded in association with the information track is detected by the position detecting device. In other words, the position detecting device detects the position of the servo mark, instead of or in addition to the position of the information track itself, as the position of the information track. Incidentally, the servo marks are recorded in advance at predetermined intervals before the information recording.

According to this aspect, in the information recording, if not even one information track has been recorded, it is possible to detect the position by using the servo mark and to perform the tracking control on the probes. Thus, particularly in the recording, the information tracks are recorded at correct positions, so that it is possible to reduce the deviation between the probes and the information tracks.

As explained above, according to the information recording/reproducing apparatus in this construction, it is possible to reduce the deviation between the probes and the information tracks by using the servo mark, thereby recording or reproducing the information, correctly.

In another aspect of the information recording/reproducing apparatus of the present invention, the information track whose position is detected is an information track only for the tracking control.

According to this aspect, the position of the information track only for the tracking control is detected by the position detecting device. In other words, the tracking control is performed on the information track only for the tracking control. There may be provided a plurality of information tracks only for the tracking control. Moreover, in addition to the information track only for the tracking control, tracking may be performed by using another information track that is not only for the tracking control.

By performing the tracking control on the information track only for the tracking control, for example, it is possible to simplify the tracking control process and to improve the accuracy of the tracking control, or the like. Thus, according to the information recording/reproducing apparatus in this aspect, it is possible to record or reproduce the information, correctly, while realizing the simplification or miniaturization of the apparatus.

The above object of the present invention can be achieved by an information recording/reproducing method in an information recording/reproducing apparatus provided with: a recording medium having a recording surface; and a plurality of probes for performing at least one process of information recording and reproduction by scanning a plurality of formation tracks in parallel, on the recording surface, the information recording/reproducing method provided with: a position detecting process of detecting a position of at least one information track by using the probes, in each of a plurality of divided areas obtained by area-dividing the recording surface in a direction crossing the plurality of information tracks and in such a manner that each divided area includes at least one information track; a tracking control process of performing tracking control on the probes in performing the at least one process, in each of the plurality of divided areas set, on the basis of the detected position of the track; and a execution process of performing the at least one process by using the probes while performing the tracking control.

According to the formation recording/reproducing method of the present invention, the recording surface of the recording medium is divided in the direction crossing the information tracks, and they are treated as the plurality of divided areas each of which includes at least one information track. With respect to the plurality of divided areas, the position of at least one information track is detected in each area by using the probes. When the position of the information track is detected, the probes are tracking-controlled on the basis of the detected position, and the information recording or reproduction is performed.

In the present invention, in particular, since the probes are tracking-controlled on the basis of the position of the information track detected in each area, the probes can scan the information track, correctly.

As explained above, according to the information recording/reproducing method of the present invention, it is possible to record or reproduce the information, correctly.

Incidentally, even the information recording/reproducing method of the present invention can adopt the same various aspects as those of the information recording/reproducing apparatus of the present invention described above.

The operation and other advantages of the present invention will become more apparent from the embodiments described below.

DESCRIPTION OF REFERENCE CODES 110 fixed part
120 recording medium
130 probe array
135 probe
140 X-direction actuator
150 X-direction spring
160 Y-direction actuator
170 Y-direction spring
210 information track
500 controller
510 setting device
520 tracking control device

DETAILED DESCRIPTION OF EXAMPLE EMBODIMENTS

Hereinafter, embodiments of the present invention will be described with reference to the drawings. In the embodiments below, an information recording/reproducing apparatus for recording information as a polarization direction onto a ferroelectric recording medium will be exemplified, which is one example of the information recording/reproducing apparatus of the present invention.

First Embodiment

Figure 1:
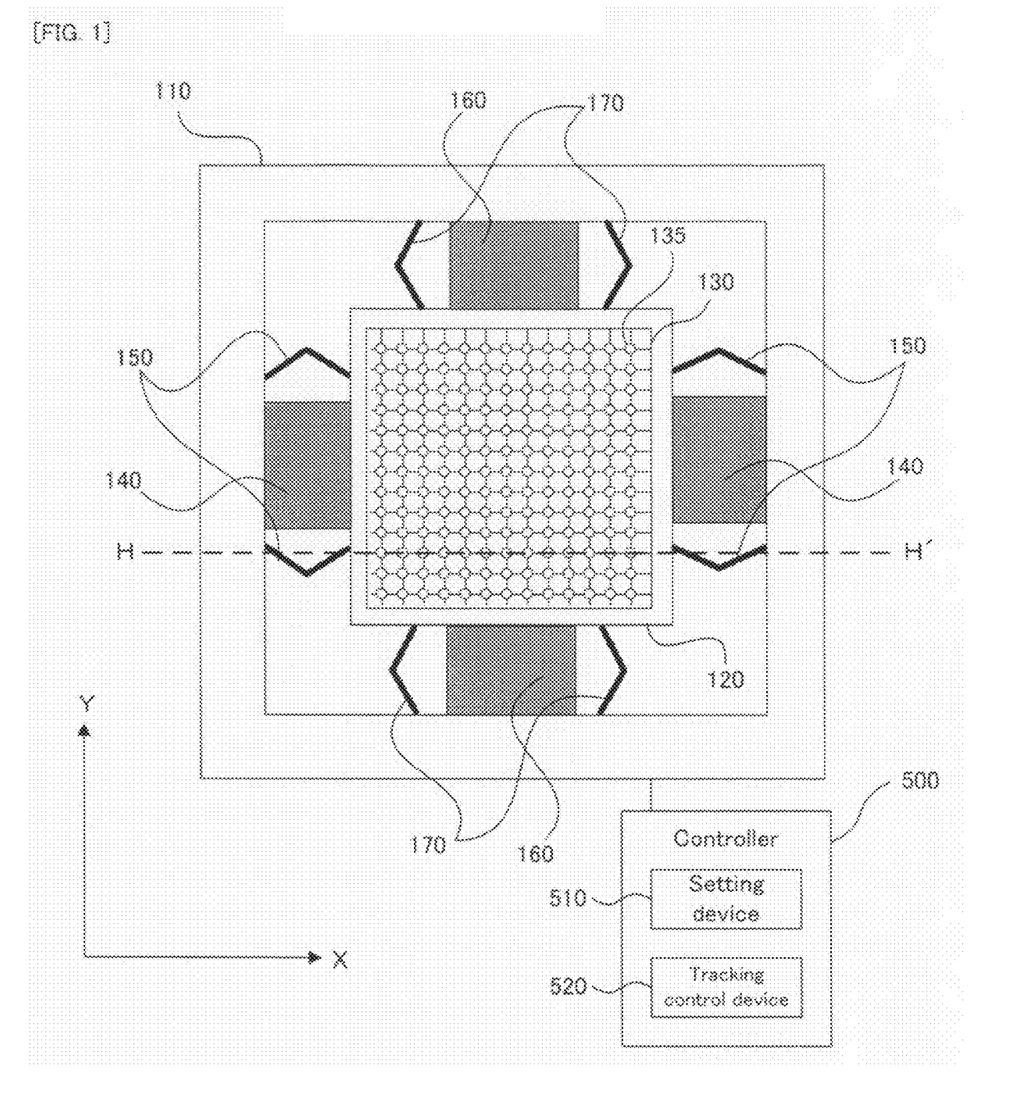
FIG. 1 is a plan view showing the structure of an information recording/reproducing apparatus in a first embodiment.
Figure 2:
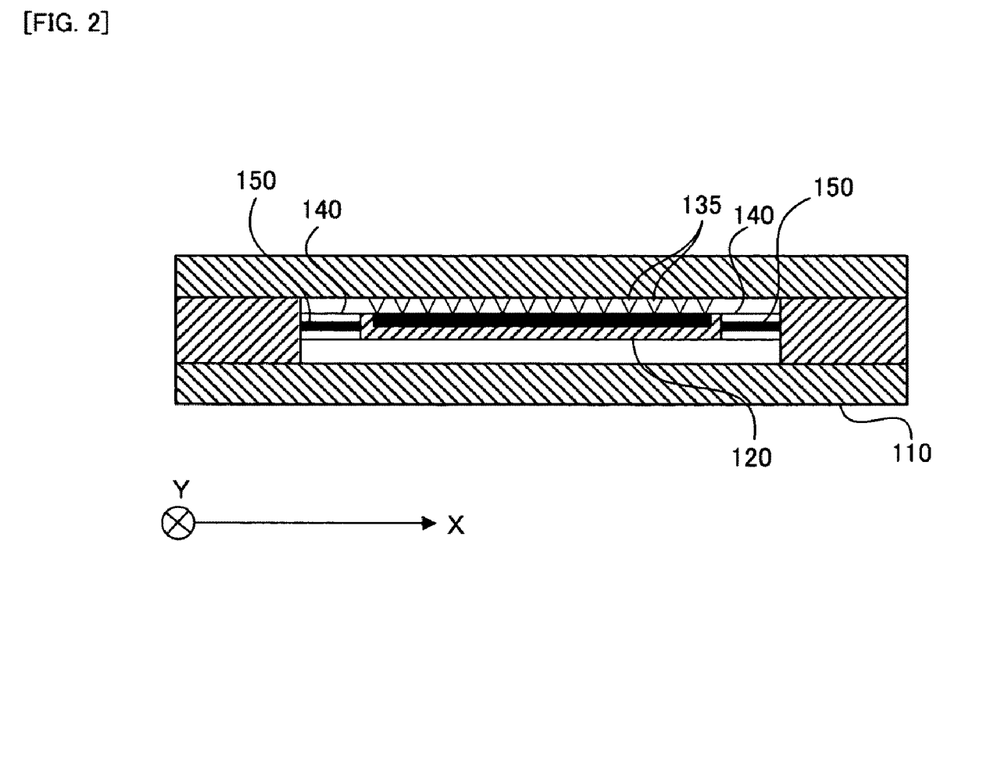
FIG. 2 is a H-H' cross sectional view in FIG. 1.
Figure 3:
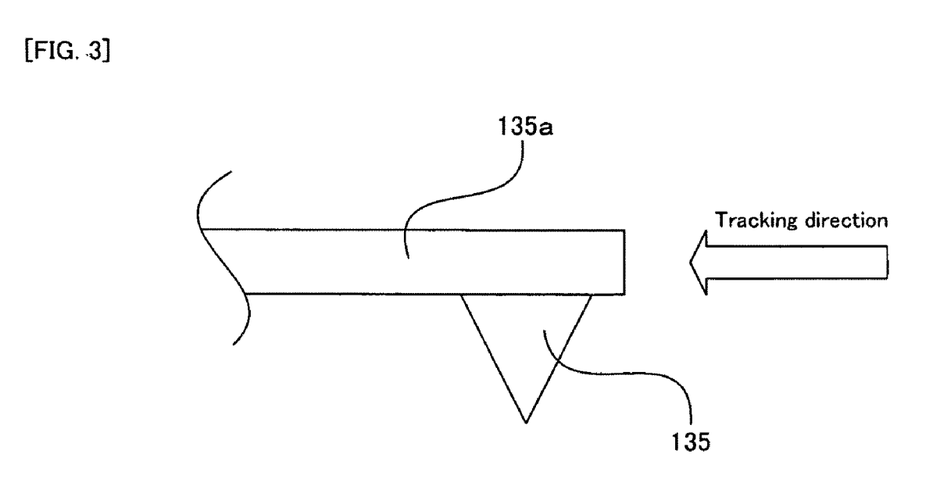
FIG. 3 is an enlarged side view showing a probe portion.

Firstly, the structure of an information recording/reproducing apparatus in the first embodiment will be described with reference to FIG. 1 to FIG. 3. FIG. 1 is a plan view showing the structure of an information recording/reproducing apparatus in the first embodiment. FIG. 2 is a H-H' cross sectional view. FIG. 3 is an enlarged side view showing a probe portion.

As shown in FIG. 1 and FIG. 2, the information recording/reproducing apparatus in the first embodiment is provided with a fixed part 110, a recording medium 120, a probe array 130 having a plurality of probes 135, X-direction actuators 140, X-direction springs 150, Y-direction actuators 160, Y-direction springs 170, and a controller 500.

The fixed part 110 is a frame for supporting the recording medium 120 and it is fixed to the apparatus.

The recording medium 120 is formed by supporting a ferroelectric thin film of a PZT (lead zirconate titanate), LiTaO$_3$ (lithium tantalite), or the like with a plate of silicon or the like. Incidentally, information is recorded on a recording surface formed of the ferroelectric thin film, as linear formation tracks which extend in an X direction in FIG. 1. Moreover, on the recording surface, in order to information track intervals in the recording, a plurality of servo marks are recorded in advance at predetermined intervals (e.g. at 20 nm intervals) in a Y direction in FIG. 1.

The probe array 130 is, for example, a glass substrate, and the plurality of probes 135 are disposed on the substrate. For example, the probes 135 are disposed in a grid of 10×10, at 1 mm intervals. By bringing the probes 135 into contact with the recording medium 120 which is an approximately 10 mm-square, signal is recorded or reproduced.

As shown in FIG. 3, the probe 135 is, for example, a probe with a small tip made of silicon. The probe 135 is supported by a support part 135$a$, thereby being formed as a cantilever. Incidentally, in addition to performing the information recording or reproduction, the probe 135 also detects the position of the information track on the recording surface of the recording medium 120, as one example of the "position detecting device" of the present invention.

Back in FIG. 1 and FIG. 2, the X-direction actuators 140, the X-direction springs 150, the Y-direction actuators 160, and the Y-direction springs 170 mutually connect the fixed part 110 and the recording medium 120. By driving each of them, the recording medium 120 is displaced in the X direction and the Y direction. This changes a relative position between the recording medium 120 and the probes 135.

The controller 500 includes, for example, an arithmetic circuit, a memory, and the like, and it is electrically connected to the X-direction actuators 140, the Y-direction actuators 160, and the like. The controller 500 includes a setting device 510, which is one example of the "setting device" of the present invention; and a tracking control device, which is one example of the "tracking control device" of the present invention. The controller 500 sets the recording surface of the recording medium 120 as divided areas, and it drives the X-direction actuators 140 and the Y-direction actuators 160, for tracking control. Moreover, in addition to the aforementioned control, another portion of the apparatus may be also controlled by the controller 500.

Figure 4:
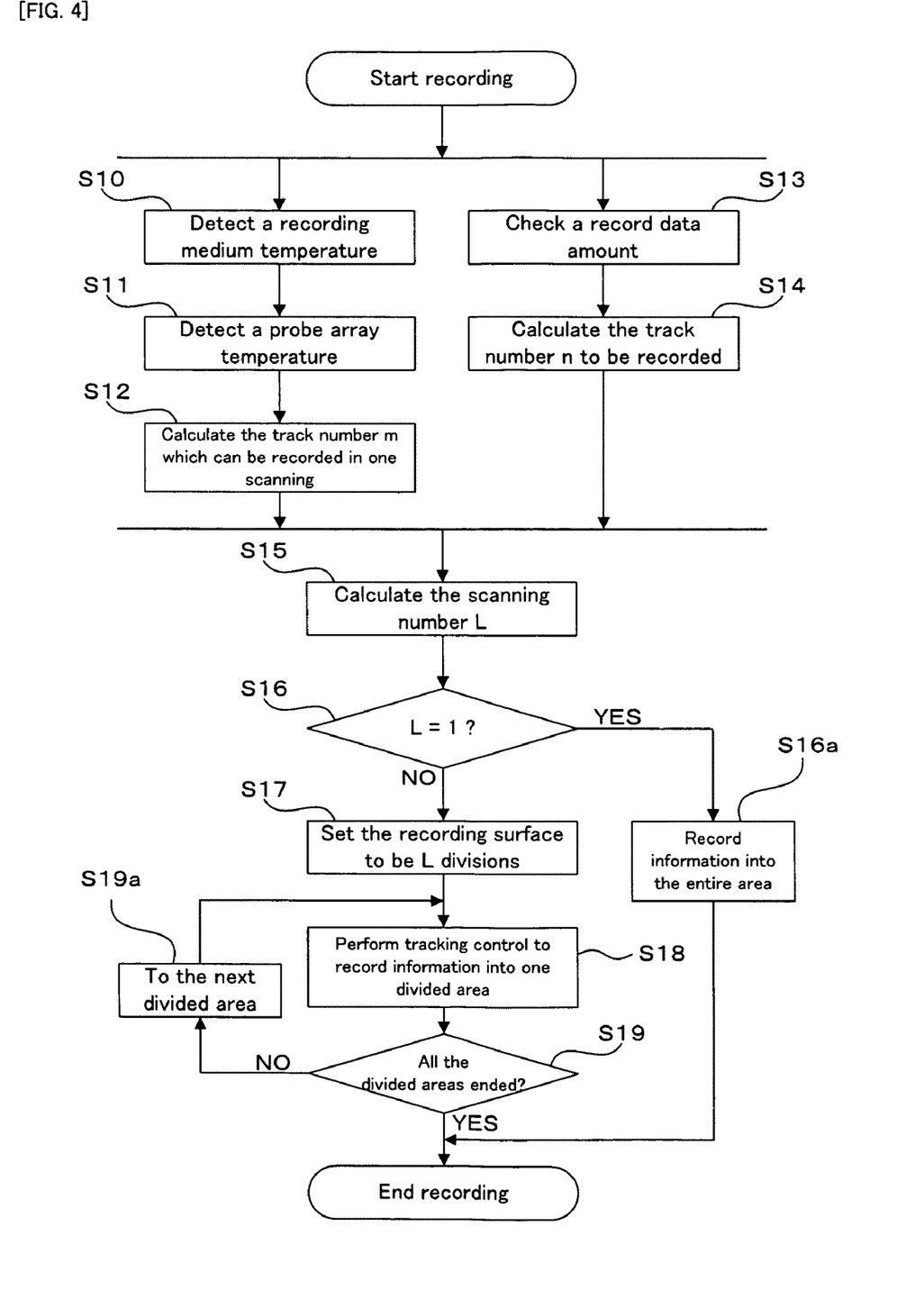
FIG. 4 is a flowchart showing operations in the recording of the information recording/reproducing apparatus in the first embodiment.
Figure 5:
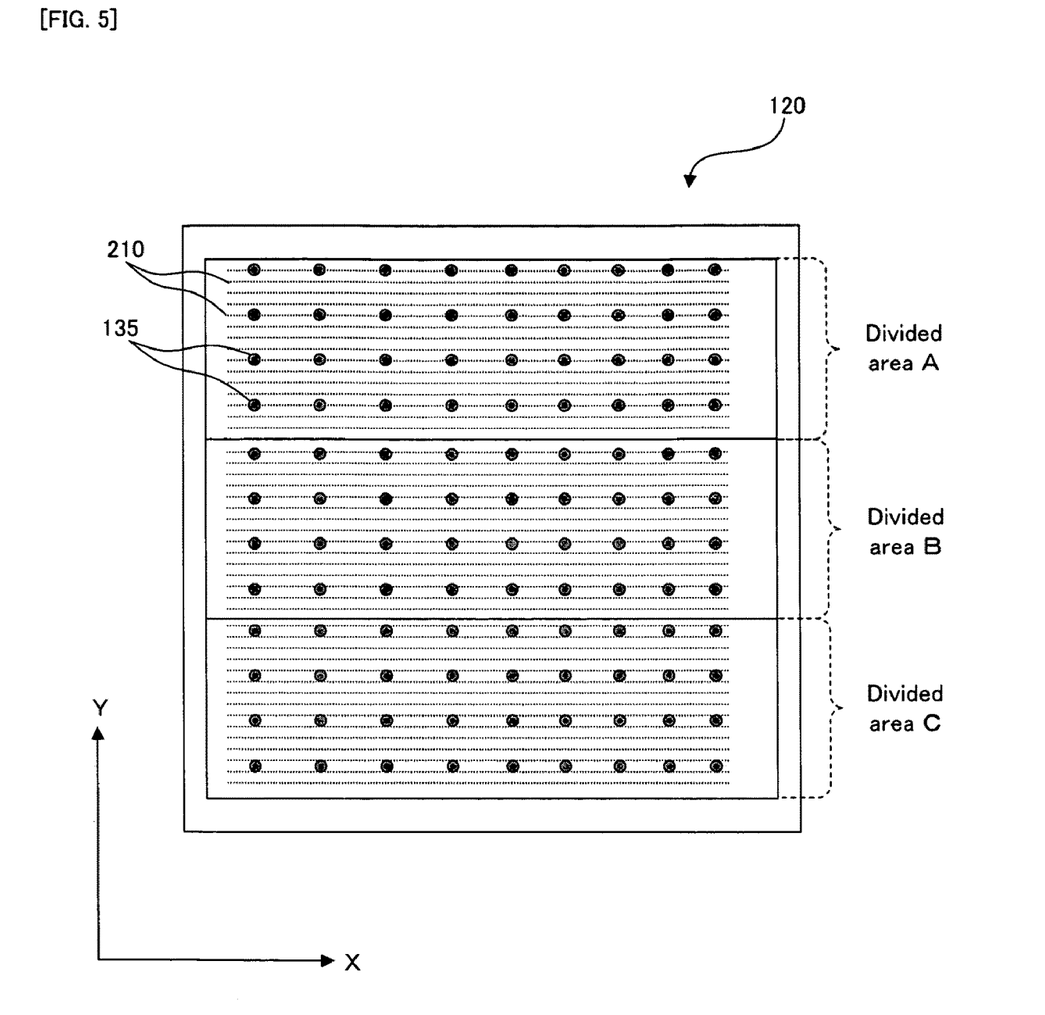
FIG. 5 is a plan view showing divided areas on a recording medium.

Next, with reference to the operations of the information recording/reproducing apparatus in the first embodiment will be described with reference to FIG. 4 and FIG. 5 in addition to FIG. 1 and FIG. 2. FIG. 4 is a flowchart showing operations in the recording of the information recording/reproducing apparatus in the first embodiment. FIG. 5 is a plan view showing the divided areas on the recording medium. Incidentally, in the information recording/reproducing apparatus in the first embodiment, the information recording and reproduction can be performed. The recording and the reproduction have a difference in operation, caused by whether to output or input the signal; however, other processes or the like until the signal input or output have the same operations. Thus, here, only the recording will be explained.

As shown in FIG. 4, in the recording of the information recording/reproducing apparatus in the first embodiment, firstly, a temperature of the recording medium 120 is detected by a thermometer (not illustrated) or the like which is one example of the "detecting device" of the present invention (step S10). Then, in the same manner, a temperature of the probe array 130 is also detected (step S11). Incidentally, the temperatures detected here are not necessarily directly detected from the recording medium 120 and the probe array 130 but may be indirectly detected, for example, by detecting members or the like which support them.

Then, from the temperatures of the recording medium 120 and the probe array 130, a deviation between the probes 135 and the servo marks caused by their thermal expansion is calculated, and from the deviation, the number m of information tracks (hereinafter referred to as the track number as occasion demands) which can be correctly recorded in one scanning is calculated (step S12).

Here, the deviation caused by the thermal expansion can be obtained, for example, from the linear expansion coefficients of the recording medium 120 and the probe array 130. For example, it is assumed that there is one temperature change, wherein the recording medium 120 has a linear expansion coefficient of $2.60 \times 10^{-6}$/deg and the probe array 130 has a linear expansion coefficient of $2.63 \times 10^{-6}$/deg. If the recording medium 120 is 10 mm on a side, the probes 135 and the servo marks have a deviation of 0.3 nm between the edge and the edge. Moreover, the track number m can be calculated from the deviation between the probes 135 and the servo marks and from an allowable range of the deviation which allows the correct recording. Incidentally, the aforementioned calculation may be performed by an actual arithmetic operation, or it may be performed on the basis of a table prepared in advance.

On the other hand, in parallel with the calculation of the track number m described above, a data amount to be recorded is also checked (step S13). Then, the track number n for recording the data to be recorded is calculated from the data amount (step S14). The track number n can be obtained, for example, by dividing the data amount to be recorded, by a data amount which can be recorded in one information track.

After the track number m and the track n are calculated, the scanning number L for recording is calculated by using them (step S15). The scanning number L can be obtained, for example, by dividing the track number n by the track number m.

After the scanning number L is calculated, it is judged whether or not L=1 applies (step S16); namely, it is judged whether or not all information can be recorded in one scanning. If L=1 does not apply (the step S16: NO), the recording surface of the recording medium 120 is set as L-divided areas (step S17). In other words, the recording surface is treated as a plurality of divided areas. If L=1 (the step S16: YES), the recording is performed in the entire area in one scanning (step S16a), and the process is ended.

As shown in FIG. 5, for example, if the scanning number L is 3, the recording surface of the recording medium 120 is divided by three as divided areas A, B, and C. Incidentally, here, the recording surface is equally divided by three; however, it is only necessary to set each divided area to include at least one information track 210, and moreover, the size of the divided areas (i.e. the number of tracks included therein) may be different. Furthermore, the number and size of the divided areas may be sequentially variable in accordance with a change in conditions.

As in the aforementioned example, if the deviation between the probes 135 and the servo marks caused by their thermal expansion is 0.3 nm in a temperature change of 1 degree, it will be a deviation of 15 nm in a temperature change of 50 degrees; however, the division by three provides a deviation of 5 nm between the edges of one divided area. Here, for example, in a case where the assumed operating temperature range of the apparatus is set from 0 degrees Celsius to 50 degrees Celsius, if it is set to have no deviation between the probes 135 and the servo marks at 25 degrees Celsius, then the deviation is only ±2.5 nm. As described above, by setting the recording surface as the plurality of divided areas, it is possible to include the deviation between the probes 135 and the servo marks, in the allowable range of the deviation which allows the correct information recording and reproduction (or without an error) to be performed on the plurality of information tracks existing in the same divided area.

Then, the probes 135 are tracking-controlled for one divided area, and the information is recorded into the divided area (step S18). Incidentally the tracking may be performed on the information track existing on the edge side of the divided area, or the information track existing on the central side. Moreover, a tracking-only track may be provided and the tracking-only track may be tracked. Moreover, it is also possible to obtain tracking signals or the like from the plurality of probes, and to perform the tracking control with an average value of the tracking signals. Moreover, as the tracking method, there can be various options if they allow the tracking of the information tracks 210, such as a wobbling method of tracking the information tracks 210 by wobbling the probes or the information tracks 210 and by using its signal change, and a sample servo method of performing the tracking from a signal in passing through a particular servo mark position.

When the recording into the one divided area is ended, it is judged whether or not the recording is ended in all the divided areas (step S19). If the recording is ended in at the divided areas (the step S19: YES), the recording is ended. On the other hand, if there is a divided area which has not been recorded yet (the step S19: NO), it proceeds to a next divided area (step S19a), and the process in the step 18 is performed on the unrecorded divided area. In other words, the recording process is repeated until the unrecorded divided area no longer exists. In this manner, when the information is recorded in all the divided areas, the process is ended.

As described above, according to the information recording/reproducing apparatus in the embodiment, the information can be recorded correctly by dividing the recording surface and performing the tracking control in each divided area. Here, only the recording was explained, but substantially the same operations are performed when the information is reproduced. Incidentally; the unique operations, effects, and the like in the reproduction will be detailed in the following explanation for second and third embodiments.

Second Embodiment

Figure 6:
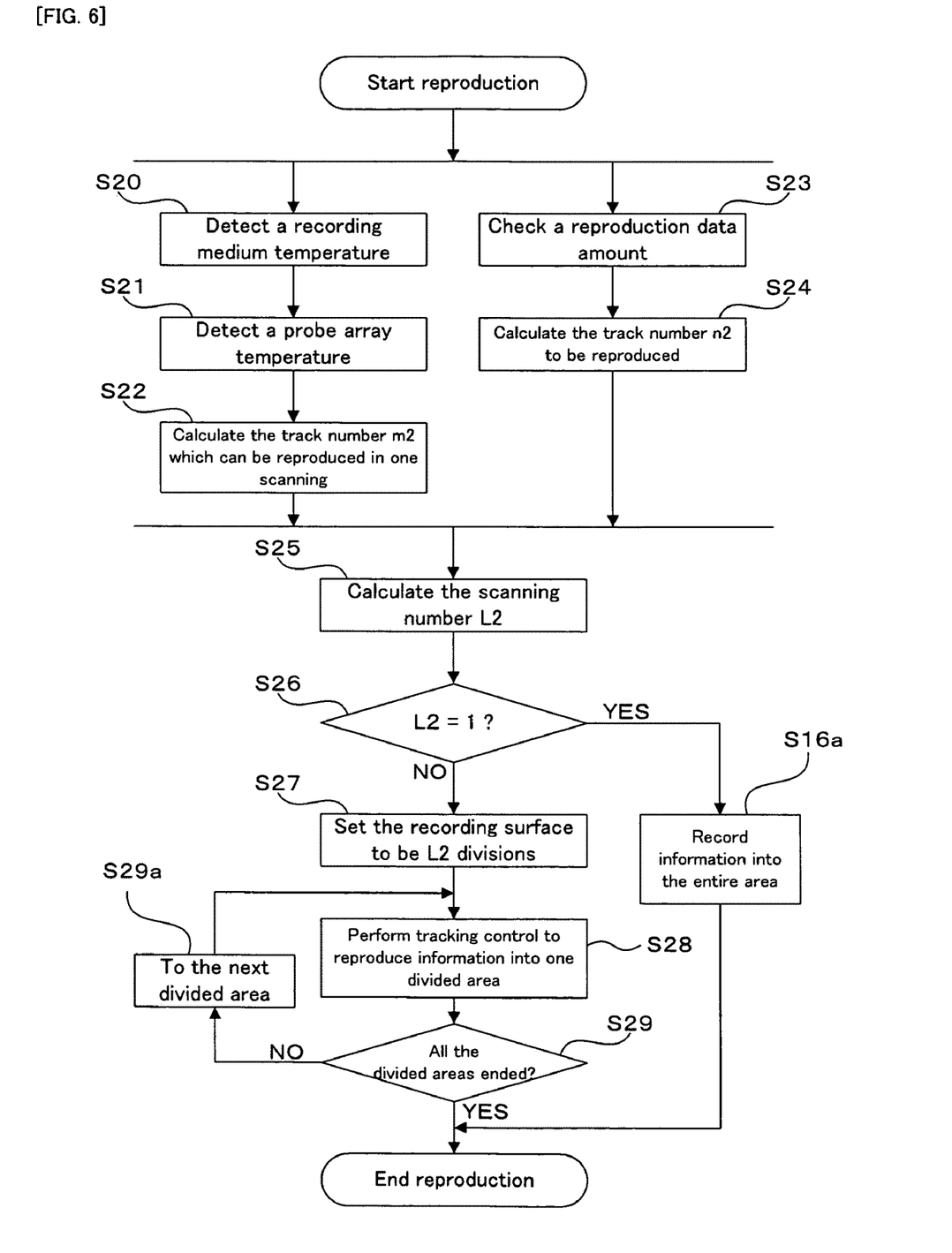
FIG. 6 is a flowchart showing operations in the reproduction of an information recording/reproducing apparatus in a second embodiment.

Next, an information recording/reproducing apparatus in a second embodiment will be described with reference to FIG. 6. FIG. 6 is a flowchart showing operations in the reproduction of the information recording/reproducing apparatus in the second embodiment. Incidentally, in the second embodiment, an explanation will be given on a case where the information recording/reproducing apparatus having the same structure as that of the aforementioned first embodiment reproduces the information.

As shown in FIG. 6, in the reproduction of the information recording reproducing apparatus in the second embodiment, firstly, a temperature of the recording medium 120 is detected by a thermometer (not illustrated) or the like which is one example of the "detecting device" of the present invention (step S20). Then, in the same manner, a temperature of the probe array 130 is also detected (step S21). Incidentally, the temperatures detected here are not necessarily directly detected from the recording medium 120 and the probe array 130 but may be indirectly detected, for example, by detecting members or the like which support them.

Then, from the temperatures of the recording medium 120 and the probe array 130, a deviation between the probes 135 and the information tracks 210 caused by their thermal expansion is calculated, and from the deviation, the number m2 of information tracks (hereinafter referred to as the track number as occasion demands) which can be correctly reproduced in one scanning is calculated (step S22).

Here, the deviation caused by the thermal expansion can be obtained, for example, from the linear expansion coefficients of the recording medium 120 and the probe array 130. Incidentally, the aforementioned calculation may be performed by an actual arithmetic operation, or it may be performed on the basis of a table prepared in advance.

On the other hand, in parallel with the calculation of the track number m2 described above, a data amount to be reproduced is also checked (step S23). Then, the track number n2 to be reproduced is calculated from the data amount (step S24). The track number n2 can be obtained, for example, by dividing the data amount to be reproduced, by a data amount which can be recorded in one information track.

After the track number m2 and the track n2 are calculated, the scanning number L2 for reproduction is calculated by using them (step S25). The scanning number L2 can be obtained, for example, by dividing the track number n2 by the track number m2.

After the scanning number L2 is calculated, it is judged whether or not L2=1 applies (step S26), namely, it is judged whether or not all information can be reproduced in one scanning. If L2=1 does not apply (the step S26: NO), the recording surface of the recording medium 120 is set as L2-divided areas (step S27). In other words, the recording surface is treated as a plurality of divided areas. If L2=1 (the step S26 YES), the reproduction is performed in the entire area in one scanning (step S26a), and the process is ended. Incidentally, it is only necessary to set each divided area, which is set in the step S27, to include at least one information track 210, and moreover, the size of the divided areas (i.e. the number of tracks included therein) may be different. Furthermore, the number and size of the divided areas may be sequentially variable in accordance with a change in conditions.

Then, the probes 135 axe tracking-controlled for one divided area, and the information is reproduced from the divided area (step S28). Incidentally, the tracking may be performed on the information track existing on the edge side of the divided area, or the information track existing on the central side. Moreover, a tracking-only track may be provided and the tracking-only track may be tracked. Moreover, it is also possible to obtain tracking signals or the like from the plurality of probes, and to perform the tracking control with an average value of the tracking signals. Moreover, as the tracking method, there can be various options if they allow the tracking of the information tracks 210, such as a wobbling method of tracking the information tracks 210 by wobbling the probes or the information tracks 210 and by using its signal change, and a sample servo method of performing the tracking from a signal in passing through a particular servo mark position. The reproduced information may be processed as serial data, or may be outputted after being accumulated in a buffer or the like.

When the reproduction from the one divided area is ended, it is judged whether or not the reproduction is ended in all the divided areas (step S29). If the reproduction is ended in all the divided areas (the step S29: YES), the reproduction is ended. On the other hand, if there is a divided area which has not been reproduced yet (the step S29: NO), it proceeds to a next divided area (step S29a), and the process in the step 28 is performed on the unreproduced divided area (or the divided area that has not been reproduced). In other words, the reproducing process is repeated until the unreproduced divided area no longer exists. In this manner, when the information is reproduced in all the divided areas, the process is ended.

As described above, according to the information recording/reproducing apparatus in the embodiment, the information can be reproduced correctly by dividing the recording surface and performing the tracking control in each divided area.

Third Embodiment

Figure 7:
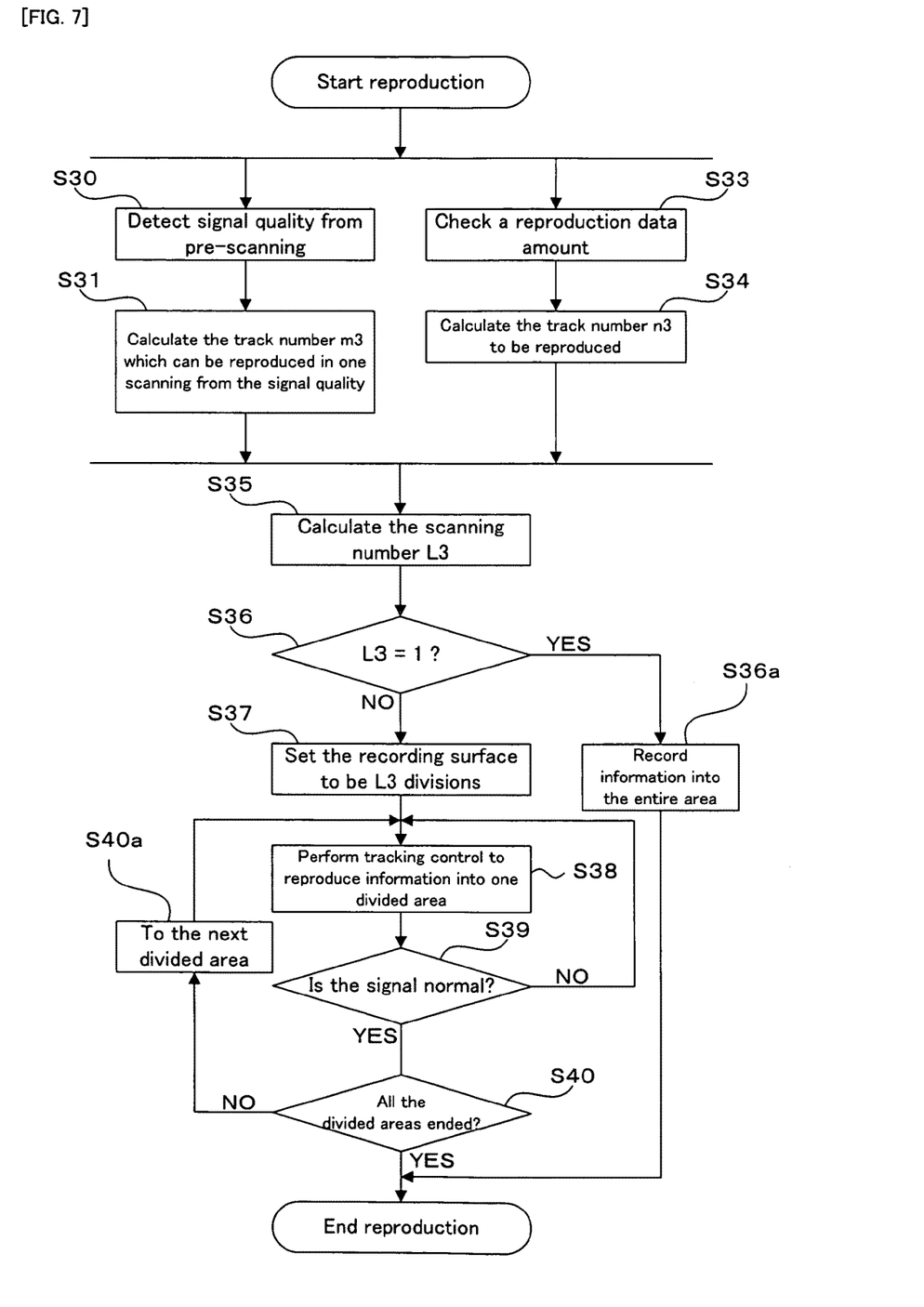
FIG. 7 is a flowchart showing operations in the reproduction of an information recording/reproducing apparatus in a third embodiment.

Next, an information recording/reproducing apparatus in a third embodiment will be described with reference to FIG. 7. FIG. 7 is a flowchart showing operations in the reproduction of the information recording/reproducing apparatus in the third embodiment. Incidentally, in the third embodiment, compared to the aforementioned first embodiment, one portion of the operations is different, and the other operations and structure are the same. Thus, in the third embodiment, the detection of signal quality or the like which is the different operation will be detailed, and an explanation for the other operations and structure will be omitted. Moreover, as opposed to the explanation for the operations in the recording in the first embodiment, the operations in the reproduction will be explained here, as in the second embodiment.

As shown in FIG. 7, according to the information recording/reproducing apparatus in the third embodiment, firstly, the quality of a signal to be obtained is detected by pre-scanning (step S30). In the third embodiment, the controller 500 is provided with a monitoring device which is one example of the "monitoring device" of the present invention, and the quality of the signal obtained by the scanning of the probes 135 is monitored by the monitoring device. Incidentally, as the signal quality, for example, amplitude of the signal, an error rate, a tracking error, a jitter amount, and the like can be used. Moreover, for the signal quality, all the information tracks 210 may be monitored, or a particular information track (e.g. information track existing on the edge side of the recording surface) may be monitored.

As described above, by detecting the signal quality, it is also possible to respond to the deviation between the probes 135 and the information tracks 210 or the like caused by an angle deviation between the recording medium 120 and the probe array 130, in addition to the deviation caused by the thermal expansion coefficient, explained in the first embodiment.

Then, from the detected signal quality, the number m3 of tracks which can be correctly reproduced in one scanning is calculated (step S31). The track number m3 can be set, for example, as the number of tracks whose signal quality is normal (i.e. the amplitude, the error rate, and the like are in respective predetermined ranges), of the information tracks 210 in which the signal is obtained by the pre-scanning.

On the other hand, in parallel with the calculation of the track number m3 described above, a data amount to be reproduced is checked (step S33). Then, the track number n3, in which the data to be reproduced is recorded, is calculated from the data amount (step S34). Incidentally the processes in the step S33 and the step S34 are performed in the same manner as the step S13 and the step S14, respectively. However, in the reproduction, if an index is recorded in the recording, it is also possible to know the data amount, the recorded position, or the like of the data to be reproduced, by referring to the index.

After the track number m3 and the track n3 are calculated, processes in a step S35 to a step S38 are performed in the same manner as those in the step S15 to the step S18, respectively. Incidentally, the reproduced information may be processed as serial data, or may be outputted after being accumulated in a buffer or the like.

When the signal is obtained by the reproduction in the step S38, it is judged whether or not the signal quality is normal (step S39). In other words, even here, the monitoring device monitors the signal quality. Now, if the signal quality is normal (the step S39: YES), the operational flow proceeds to a process in a step S40. If the signal quality is not normal (the step S39: NO), the process in the step S38 is performed again by the controller 500 including a processing control device which is one example of the "processing control device" of the present invention. Here, the tracking is performed on the information track 210 in which the signal is not normal. Thus, it is also possible to obtain the signal with high quality, even from the information track 210 in which the normal signal was not obtained in the first scanning (i.e. the first process in the step S38). Incidentally, the scanning may not be performed on the information track 210 in which the signal quality is normal in the first scanning.

Then, as in the step S29, it is judged whether or not the reproduction is ended in all the divided areas (step S40). By this, the reproducing process is repeated until the unreproduced divided area no longer exists. In this manner, when the information is reproduced in all the divided areas, the process is ended.

As described above, according to the information recording/reproducing apparatus in the third embodiment, the information can be reproduced correctly by monitoring the signal quality. Moreover, only the reproduction was explained here; however, even when the information is recorded, it is possible to detect the signal quality by pre-recording test data or the like. Thus, the third embodiment can be applied to the information recording.

The present invention can be applied not only to an information recording/reproducing apparatus which uses the polarization of the ferroelectric substance explained in the aforementioned embodiments but also to an information recording/reproducing apparatus which uses a method of recording information as unevenness into a polymer film, a phase change method of recording information by crystallizing a phase change medium, a near-held recording method using a small optical spot, or the like.

The present invention is not limited to the aforementioned example, but various changes may be made, if desired, without departing from the essence or spirit of the invention which can be read from the claims and the entire specification. An information recording/reproducing apparatus and method, and a computer program, all of which involve such changes, are also intended to be within the technical scope of the present invention.

INDUSTRIAL APPLICABILITY

The present invention can be applied to an information recording/reproducing apparatus or the like for recording information onto a recording medium which is formed of a ferroelectric substance or the like or reproducing the recorded information, using a plurality of probes arranged in an array form.

The invention claimed is:

1. An information recording/reproducing apparatus for recording/reproducing information from a recording medium having a recording surface, the information recording/reproducing apparatus comprising:

a plurality of probes for performing at least one process of information recording and information reproducing by scanning a plurality of information tracks in parallel, on the recording surface;

a position detecting device for detecting a position of at least one information track by using the probes, in each of a plurality of divided areas resulting from area-dividing the recording surface in a direction crossing the plurality of information tracks in such a manner that each divided area includes at least one information track;

a tracking control device for performing tracking control, in the direction crossing the plurality of information tracks, of the probes, in performing the at least one process in each of the plurality of divided areas, on the basis of the detected position of the at least one information track, in each of the plurality of divided areas; and a setting device for setting at least one of a number and a size of the plurality of divided areas in accordance with a value or status of a type of signal obtained by the scanning of the probes.

2. The information recording/reproducing apparatus according to claim 1, wherein the position detecting device detects, for each respective divided area, the position of one information track on one edge side of the respective divided area.

3. The information recording/reproducing apparatus according to claim 1, wherein the position detecting device detects, for each respective divided area, the position of one information track in a central portion of the respective divided area.

4. The information recording/reproducing apparatus according to claim 2, further comprising:
a monitoring device for monitoring quality of the type of signal obtained by probes scanning one or a plurality of information tracks on another edge side opposite to the one edge side, in the respective divided areas,
the setting device resetting the plurality of divided areas for performing the at least one process again for information for which the at least one process has been performed on the one or the plurality of information tracks on the other edge sides of the divided areas, if the monitored quality does not reach a predetermined threshold value,
the information recording/reproducing apparatus further comprising a processing control device for controlling the probes to perform the at least one process again on the one or the plurality of information tracks on the other edge sides of the divided areas, if the plurality of divided areas are reset.

5. The information recording/reproducing apparatus according to claim 3, further comprising:
a monitoring device for monitoring quality of the type of signal obtained by the probes scanning one or a plurality of information tracks existing in the central portion, in the respective divided areas,
the setting device resetting the plurality of divided areas for performing the at least one process again for information for which the at least one process has been performed on the one or the plurality of information tracks in the central portions of the divided areas, if the monitored quality does not reach a predetermined threshold value,
the information recording/reproducing apparatus further comprising a processing control device for controlling the probes to perform the at least one process again on the one or the plurality of information tracks in the central portions of the divided areas, if the plurality of divided areas are reset.

6. The information recording/reproducing apparatus according to claim 1, further comprising:
a monitoring device for monitoring quality of the type of signal obtained by the probes scanning,
the setting device resetting the plurality of divided areas for performing the at least one process again, if the monitored quality does not reach a predetermined threshold value,
the information recording/reproducing apparatus further comprising a processing control device for controlling the probes to perform the at least one process again, if the plurality of divided areas are reset.

7. The information recording/reproducing apparatus according to claim 1, wherein the position detecting device detects servo marks recorded in association with information tracks on the recording surface.

8. The information recording/reproducing apparatus according to claim 1, wherein information tracks whose positions are detected comprise information tracks only for tracking control.

9. An information recording/reproducing apparatus for recording/reproducing information from a recording medium having a recording surface, the information recording/reproducing apparatus comprising:
a plurality of probes for performing at least one process of information recording and information reproducing by scanning a plurality of information tracks in parallel, on the recording surface;
a position detecting device for detecting a position of at least one information track by using the probes, in each of a plurality of divided areas resulting from area-dividing the recording surface in a direction crossing the plurality of information tracks in such a manner that each divided area includes at least one information track;
a tracking control device for performing tracking control, in the direction crossing the plurality of information tracks, of the probes, in performing the at least one process in each of the plurality of divided areas, on the basis of the detected position of the at least one information track, in each of the plurality of divided areas;
a detecting device for detecting at least one of a temperature related to the recording medium and a temperature related to the probes; and
a setting device setting the plurality of divided areas in accordance with the detected temperature.

10. An information recording/reproducing apparatus for recording/reproducing information from a recording medium having a recording surface, the information recording/reproducing apparatus comprising:
a plurality of probes for performing at least one process of information recording and information reproducing by scanning a plurality of information tracks in parallel, on the recording surface;
a position detecting device for detecting a position of at least one information track by using the probes, in each of a plurality of divided areas resulting from area-dividing the recording surface in a direction crossing the plurality of information tracks in such a manner that each divided area includes at least one information track;
a tracking control device for performing tracking control, in the direction crossing the plurality of information tracks, of the probes, in performing the at least one process in each of the plurality of divided areas, on the basis of the detected position of the at least one information track, in each of the plurality of divided areas; and
a setting device for setting the plurality of divided areas in accordance with an amount of information.

11. An information recording/reproducing apparatus for recording/reproducing information from a recording medium having a recording surface, the information recording/reproducing apparatus comprising:
a plurality of probes for performing at least one process of information recording and information reproducing by scanning a plurality of information tracks in parallel, on the recording surface;
a position detecting device for detecting a position of at least one information track by using the probes, in each of a plurality of divided areas resulting from area-dividing the recording surface in a direction crossing the plurality of information tracks in such a manner that each divided area includes at least one information track;
a tracking control device for performing tracking control, in the direction crossing the plurality of information tracks, of the probes, in performing the at least one process in each of the plurality of divided areas, on the basis of the detected position of the at least one information track, in each of the plurality of divided areas; and
a setting device for calculating a number of information tracks for recording information on the basis of an amount of the information, the setting device setting the plurality of divided areas in accordance with the calculated number of the information tracks.

12. An information recording/reproducing method for use in an information recording/reproducing apparatus, for recording/reproducing information from a recording medium having a recording surface, comprising a plurality of probes for performing at least one process of information recording and information reproducing by scanning a plurality of information tracks in parallel, on the recording surface, the information recording/reproducing method comprising:

detecting a position of at least one information track by using the probes, in each of a plurality of divided areas resulting from area-dividing the recording surface in a direction crossing the plurality of information tracks in such a manner that each divided area includes at least one information track;

performing tracking control, in the direction crossing the plurality of information tracks, of the probes, in performing the at least one process, in each of the plurality of divided areas, on the basis of the detected position of the at least one information track, in each of the plurality of divided areas; and     performing the at least one process by using the probes while performing the tracking control; and     setting at least one of a number and a size of the plurality of divided areas in accordance with a value or status of a type of signal obtained by scanning of the probes.

\* \* \* \* \*